Nov. 16, 1965 H. A. PETRAK 3,217,847
AUTOMATIC CLUTCH WITH LOCKING MEANS
Filed April 8, 1963 2 Sheets-Sheet 1
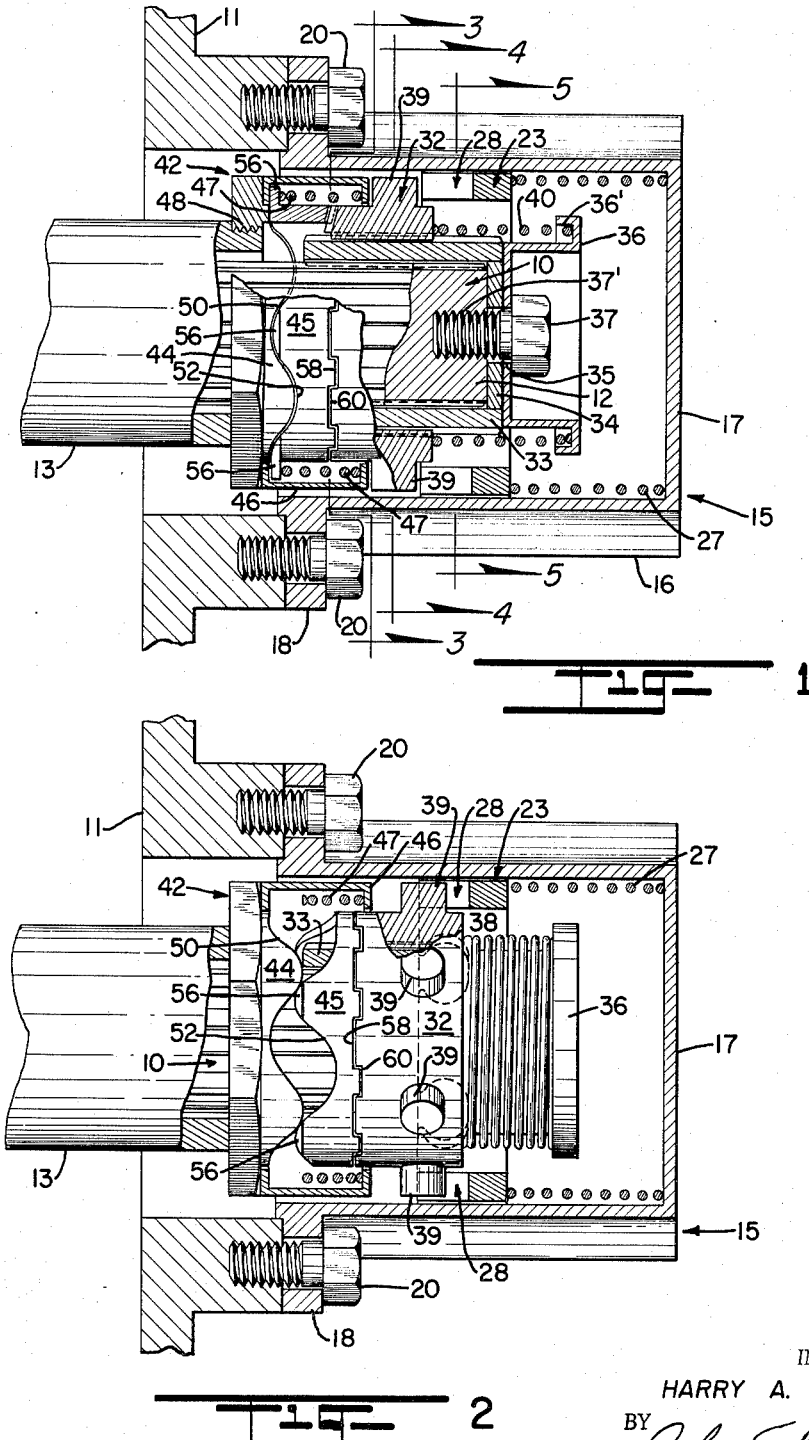
INVENTOR.
HARRY A. PETRAK
BY
ATTORNEY Nov. 16, 1965 H. A. PETRAK 3,217,847
AUTOMATIC CLUTCH WITH LOCKING MEANS
Filed April 8, 1963 2 Sheets-Sheet 2

INVENTOR.
HARRY A. PETRAK
BY
ATTORNEY

United States Patent Office 3,217,847
Patented Nov. 16, 1965

3,217,847
AUTOMATIC CLUTCH WITH LOCKING MEANS
Harry A. Petrak, 209 29th St., Boulder, Colo.
Filed Apr. 8, 1963, Ser. No. 271,188
12 Claims. (Cl. 192—31)

This invention relates to clutches, and more particularly relates to a reversible clutch for use in four-wheel drive vehicles which is fully automatic in effecting positive engagement and disengagement between the front drive axle and wheels under all driving conditions and independently of the relative speed of rotation therebetween.

Numerous machine and automotive applications require the use of a clutch between the drive and driven members to establish selective engagement therebetween when power or torque is applied to the drive member. In such applications, it is highly desirable that the clutch be automatically and instantaneously responsive to the application of power to the drive member in such a way as to effect engagement with the driven member and to maintain such engagement until the power is removed, at which time the clutch will automatically and positively disengage the members. For instance, the front drive axle in a four-wheel drive vehicle should be coupled to the front wheels only when power is applied through the front gear differential to rotate the axle. However, when the propeller shaft and front gear differential are disengaged at the gear box, similarly the front wheels should be disengaged from the drive axle to prevent the forced rotation of the driving parts forwardly of the shift mechanism and gear box. Otherwise such forced rotation will impose a heavy parasitic load on the vehicle increasing more than proportionately with speed and causing considerable wear and possible damage to the driving parts.

In the past, various clutching mechanisms have been utilized between the front drive axle and wheels to permit the operator to manually disengage the drive axle from the front wheels so that the latter are free to rotate independently of the front drive system. In addition, various clutches or free-wheeling devices of the automatic type have been introduced but in general depend for engagement or disengagement upon some condition other than the engagement or disengagement of the front wheel drive system and therefore are not fully automatic under all driving conditions. For instance, the overrunning clutch conventionally will effect engagement between the front drive axle and wheel whenever the axle speed exceeds the rotational speed of the wheel, and will automatically disengage when the wheel overruns the axle so as not to be subject to control by the driver. Under some conditions, however, it is desirable to hold the axle and wheel in engaged or disengaged relation irrespective of relative speeds of rotation. For example, in descending a hill the clutch will automatically disengage whenever the wheel speed exceeds the axle speed so as not to afford the desired braking action of the front gear differential into the wheels. As a result, it is more or less conventional practice with so-called automatic clutches to provide some supplementary means of manual engagement or disengagement under conditions where the clutch mechanism would not otherwise be automatically subject to control by the driver.

In accordance with the present invention, an automatic clutch has been devised which will automatically engage or disengage the front wheels and the front driving axle in direct response to engagement or disengagement of the front wheel drive system and which will maintain such relation independently of changes in driving conditions or of the relative speed of rotation between the wheels and drive axle. In this way, it is possible to obviate the use of auxiliary manual engaging and release means for the clutch and to place the automatic clutch mechanism under the complete control of the operator at all times.

Accordingly, it is a principal and foremost object of the present invention to provide an automatic clutch for effecting engagement and disengagement between drive and driven members in direct response to the application of power or torque to the driving member, and to do so in a positive and dependable manner.

It is another object of the present invention to provide a reversible clutch for four-wheel drive vehicles which is fully automatic in effecting engagement and release between the front wheels and drive axle independently of driving conditions and relative speeds of rotation; moreover, where engagement is established and maintained between the front wheels and drive axle in direct response to engagement of the front wheel drive system and the resultant torque applied to the front axle in either direction of rotation.

It is a further object of the present invention to provide an automatic clutch which is characterized by having a minimum number of moving parts, is greatly simplified in construction and economical to manufacture and install; furthermore, to provide a clutch for four-wheel drive vehicles which is easily interchangeable for use on virtually all types and sizes of vehicles; and additionally minimizes the adverse effects of weather, rusting, foreign particles and wear in operation.

It is an additional object of the present invention to provide in a clutch assembly a new and improved shifting mechanism for automatically establishing engagement and disengagement between the locking elements of the clutch in direct response to torque applied to the driving member; furthermore, wherein the locking elements will maintain reversible engagement between the driving and driven members independently of the relative speeds of rotation therebetween.

The above and other objects, advantages, and features of the present invention will become more readily understood and appreciated from a consideration of the following detailed description, taken together with the accompanying drawings, in which:

FIGURE 1 is a view partially in section and with parts broken away of a preferred form of automatic clutch disposed between a front wheel portion and drive axle in a four-wheel drive vehicle, the clutch being illustrated in the disengaged position.

FIGURE 2 is another view, partially in section, with parts broken away, of the preferred clutch and showing the relative disposition and arrangement between parts in moving into the engaged position.

Figure 3:
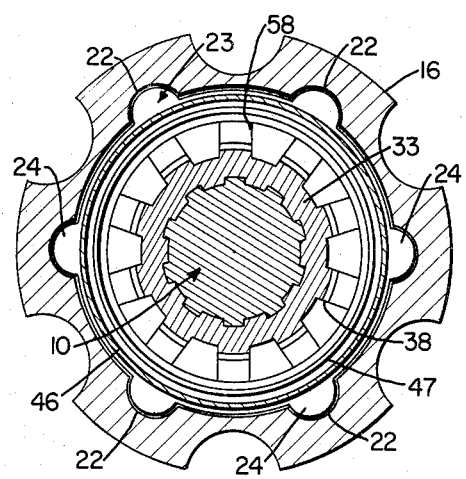
FIGURE 3 is a section view taken on 3—3 of FIGURE 2.

Referring more particularly to the drawings, the important features and advantages of the automatic clutch of the present invention may be best understood in connection with its use in controlling engagement and release between a front driving axle shaft 10 and a spaced outer concentric wheel 11 in a four-wheel drive vehicle, as shown in FIGURES 1 and 2. The front axle has an outer splined end portion 12 and is journaled within a stationary axle housing 13. In turn, the wheel portion 11 is independently mounted for rotation with respect to the axle housing by bearings, not shown, and it will be understood that this general construction and arrangement is in accord with the conventional practice.

Figure 4:
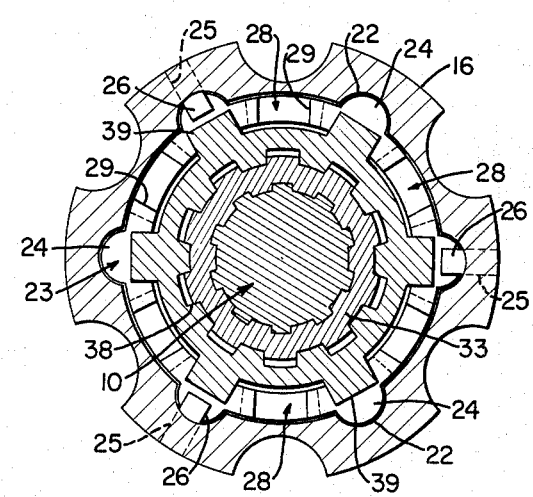
FIGURE 4 is a sectional view taken on line 4—4 of FIGURE 2.

Projecting outwardly from the wheel portion 11 is a cover assembly 15 formed of a relatively thick, hollow cylindrical casing 16 with an end plate 17 at one end and a connecting flange 18 secured by bolts 20 to the wheel portion 11. The inner surface of the casing is provided with spaced axial guideways 22 for insertion of a locking ring 23 having correspondingly spaced external rounded portions 24, the latter being slidable through the guideways to secure the locking ring against rotation. In order to fix the locking ring within the casing, the ring is positioned in the casing outwardly of a series of spaced openings 25 in the wall of the casing; radial pins 26 are inserted in press-fit relation through the aligned openings, as best seen in FIGURE 4, and a compression spring 27 is interpositioned between the end plate 17 and the locking ring to urge the ring inwardly and hold it firmly against the pins 26.

Figure 5:
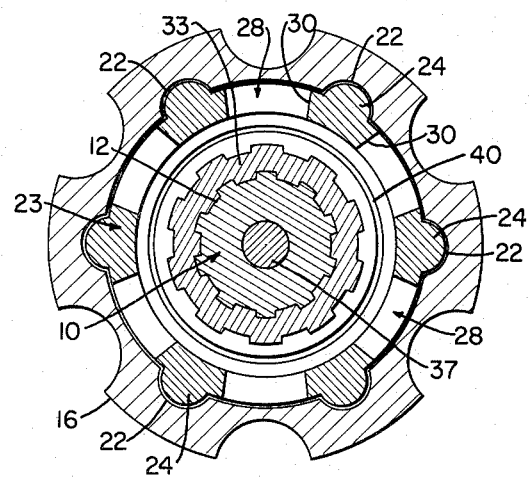
FIGURE 5 is a sectional view taken on line 5—5 of FIGURE 2.
Figure 6:
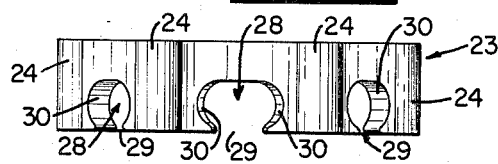
FIGURE 6 is an enlarged view of the locking ring employed in the preferred form of the present invention.

The locking ring 23 defines the driven locking element of the clutch and, in a manner to be described, enables positive engagement between the drive axle and driven wheel under either direction of rotation of the drive axle. To this end, and as best seen from FIGURES 5 and 6, the locking ring 23 has a series of open slots 28 at spaced circumferential intervals around its inner surface, the slots opening through the end of the locking ring opposite the compression spring 27. Each slot is of generally oval form having a limited entrance 29 with divergent sides 30 inclining or curving away from the entrance and forming guide surfaces for the drive locking member to be described.

The drive locking member, engageable with the locking ring, is preferably in the form of a drive clutch 32 which is slidably splined on the axle end portion 12 through a splined axle sleeve or adaptor 33. The adaptor is of a length to locate the drive clutch in desired relation to the locking ring for movement into and out of locking engagement, and further is dimensioned to key the drive clutch for rotation with the drive axle; of course, the adaptor may be eliminated and the drive clutch suitably dimensioned in accordance with the axle size for direct splined connection therewith. In the preferred form, however, the adaptor has inner and outer splined surfaces and an end plate 34 with a central opening 35, the adaptor being positioned over the end of the axle and secured thereto by a cup-shaped washer element 36 and bolt 37 which is inserted through the central opening 35 and threaded into bore 37' at the end of the axle. The drive clutch 32 has an inner splined surface 38 formed for splined engagement with the external surface of the adaptor while being freely slidable in an axial direction relative to the adaptor and the drive axle. Radial locking pins 39 project outwardly at spaced circumferential intervals from the drive clutch, the spacing of the pins corresponding to that of the slots 38 on the locking ring; also, each pin is sized for insertion through the limited opening forming the entrance 29 into each slot. Accordingly, by rotating and simultaneously displacing the drive clutch outwardly along the axle toward the locking ring, the locking pins 39 are movable through the entrances 29 and along one of the divergent sides 30 into locking engagement with the slots thereby forcing the casing 16 and wheel hub 11 to rotate with the drive clutch 32 and drive axle. Normally, the drive clutch 32 and pins 39 are biased away from engagement with the locking ring by means of a compression spring 40 having one end positioned against external lip 36' of the cup washer 36 and the opposite end acting against the end of the drive gear. The disposition of the spring in relation to the drive clutch serves the added important function of exerting an outward pull on the end of the axle and adaptor thereby overcoming any tendency of the axle to withdraw inwardly through the axle housing.

The drive clutch 32 is displaced outwardly and lengthwise of the axle by an actuator or shift mechanism 42 which is positioned between the end of the axle housing 13 and the drive gear 32. In the preferred form, the shift mechanism comprises a fixed cam member 44 and movable cam member 45, both of hollow cylindrical configuration, disposed in coaxial relation to one another and in spaced outer concentric relation to the drive axle 12. The fixed cam is enclosed within an outer spring retainer ring 46 for a spring 47, the ring 46 and cam 44 terminating in a common threaded end 48 for threaded connection to the end of the axle housing. The fixed cam 44 has a plurality of circumferentially extending, generally convex cam portions 50. The movable cam member 45 is disposed within the ring 46 outwardly of the fixed cam and has a plurality of complementary cam portions 52 inter-engaging with the fixed cam portions 50 under the influence of the spring 47 acting against spaced external flanges 56 at the base of the movable cam.

To initiate movement of the cam 45 relative to the cam 44, the end of the movable cam opposite the cam portions 52 has teeth 58 spaced for intermeshing engagement with teeth 60 at the end of the drive clutch 32. Since the drive gear is biased against the movable cam by the spring 40, the movable cam will be constrained to follow the rotatable movement of the drive gear through the intermeshing teeth 58 and 60; but will be controlled in axial movement by movement of the cam portions 52 outwardly along the cam portions 50 of the fixed cam. Accordingly, torque applied to the inner drive axle 10 will initiate rotation of the drive clutch and movable cam 45 relative to the fixed cam so that the cam portions 52 are forced to move outwardly along the cam portions 50 from a retracted position, as shown in FIGURE 1, to an extended position shown in FIGURE 2; and the movable cam will cause corresponding outward axial displacement of the drive gear toward the locking ring against the urging of the spring 40. In this relation, the rise of the fixed cam portions 50 is sufficient to axially displace the movable cam and drive gear outwardly a distance such that the locking pins 39 will pass just over half way through the slot entrances 29 as illustrated in FIGURE 2. Thereafter, each of the pins 39 will continue to be drawn outwardly away from the fixed cam by one or the other of the divergent sides 30 of each slot, depending on the direction of rotation of the drive axle. As the locking pins undergo continued axial movement into the slots the movable cam portions 52 will continue to rise slightly then begin to fall along the cam portions 50 in following the rotation of the drive gear. At this point the intermeshing teeth portions 58 and 60 will separate, the movable cam returning to the retracted stationary position shown in FIGURE 1 under the urging of the spring 47; whereas the drive gear will remain in driving, locked engagement with the locking ring as long as the drive axle is under rotation.

If, in the position shown in FIGURE 2, the rotational force applied to the drive axle is released thus relaxing the pressure holding the pins within the slots, the pins will move away from the slots under the urging of the spring 40 for return to the original disengaged position of FIGURE 1. It is not especially important whether the teeth 60 return immediately to intermeshing engagement with the teeth 58 since, as soon as torque is again applied to the drive axle, the drive gear teeth 60 would initially move into intermeshing engagement with the movable cam. Preferably the teeth 58 and 69 are inclined inwardly toward the center, as shown in FIGURE 1, so that the drive clutch teeth 60 will guide the drive clutch into centered relation to the movable cam upon movement away from the locking ring. Also, the inclined relation between the teeth will aid in resisting any tendency of the drive axle to shift or move out of concentric relation.

In practice, and assuming that the drive axle is not under rotation, the drive clutch will remain in the disengaged position so that the wheel is free-wheeling and will follow the rotation of the rear axle drive. However, when torque is applied to the drive axle, such as by engaging the front axle drive system, the drive clutch will automatically be forced outwardly into locking engagement with the rotating ring 23 and wheel hub 11 under the forced rotation of the drive axle. In this relation, as the movable cam 45 is forced outwardly along the fixed cam portions 50, the locking pins may initially engage the end surfaces of the locking ring between the slots 29; however, since the locking ring is under continuous rotation the slots will rapidly move into alignment with the pins to permit continued movement of the pins 39 therethrough. It is important to note further that locking engagement between the pins and locking ring is established not withstanding the relative speed of the front wheels to the drive axle and such engagement will be maintained through any changes in speed between the members. For instance, if the wheels are rotating faster than, or overrunning, the front drive axle so that effectively each locking ring acts as the driving member, nevertheless locking engagement will be maintained so long as torque is applied to the drive axle. Accordingly, the clutch mechanism of the present invention is both automatic and reversible, or in other words, is capable of reversible locking engagement between the drive and driven members, whichever side of the clutch acts as the driving member. Therefore the clutch is under the complete control of the vehicle operator under all driving conditions and independently of the relative speed of rotation between the front wheels and drive axle.

In the preferred form, and for the purpose of illustration and not limitation, the locking ring is given six slots compared with four cam portions on each of the cams 44 and 45; and most desirably, the number of cam portions is less than the number of slots and pins to insure that the pins will be held in outwardly displaced relation over a time interval sufficient for the slots to rotate into alignment with the pins and to permit limited movement of the pins through the slot entrances. Otherwise, should the number of cams be equal to or greater than the number of slots, there is the possibility that the drive gear would rise and fall a number of times before moving into desired alignment with rotating slots; and this would be especially true when the axle speed equals the wheel speed. By employing a less number of cams, even though the axle and wheel are at the same speed, the drive gear rise and fall could not become synchronized with the rotation of the locking ring and necessarily would move rapidly into desired alignment. In addition, it is preferable to provide slightly more than the required rise on the cam portions to insure that the pins will have passed a little over midway through the slot entrances before the cam portions reach the fully extended position. In this way, the cam portions will work with the slots momentarily in urging the pins into locking engagement before the movable cam falls away from the drive gear and returns to the retracted position. From the above, it will be apparent that the cam portions may undergo some modification in configuration so long as they are properly inclined with respect to one another to cause automatic outward axial displacement of the drive clutch in response to rotation of the drive axle. Further, although the movable cam 45 is preferably in the form of a separable axial extension of the drive gear, the teeth may be eliminated and the cam 45 formed as an integral part of the clutch member 32. In that event the cam will follow the movement of the drive clutch in the engaged position and will return to the retracted position against the fixed cam only when the drive gear is released.

It is to be understood from the foregoing that various other modifications and changes may be made in the construction and arrangement of parts comprising the present invention, as well as its intended application, without departing from the spirit and scope thereof as defined by the appended claims.

What is claimed is:

1. A clutch adaptable for effecting locking engagement between a driving member and driven member in response to rotation of the driving member, said clutch comprising first locking means carried by the driven member, second locking means being connected for rotation on the driving member and being axially movable into and out of locking engagement with said first locking means, a fixed actuating member, a movable actuating member interpositioned between said fixed actuating member and said second locking means and being rotatable in response to rotation of the driving member, and said actuating members having inter-engaging portions being formed to axially displace said movable actuating member upon rotation thereof away from said fixed actuating member a sufficient distance to displace said second locking means into rotatable locking engagement with said first locking means, one of said locking means having radially projecting pins and the other of said locking means having pin-receiving slots, each slot including a limited entrance for reception of a pin and an inner wall diverging away from the entrance to encourage movement of the pin into the respective slot.

2. An automatic clutch disposed for selective locking engagement of an inner driving member with an outer concentric member to be driven when torque is applied to said driving member, said clutch comprising first locking means intruding from said outer member, second locking means being keyed for rotation on said driving member while being free to move axially therealong into rotatable locking engagement with said first locking means, a fixed actuating member, a movable actuating member drivingly connected to said second locking means, resilient means on said inner driving member yieldably urging said second locking means away from said first locking means and toward said fixed actuating member, and said actuating members having inter-engaging surface portions there-between being operative to axially displace said second locking means against the urging of said resilient means when torque is applied to said inner driving member whereby to move said second locking means into rotatable locking engagement with said first locking means for rotation of said outer concentric member in response to rotation of said inner driving member.

3. An automatic clutch according to claim 2, one of said locking means having radially projecting pins and the other of said locking means having pin-receiving slots, each slot providing a limited entrance for insertion of a pin and divergent walls extending away from the entrance whereby to cause continued axial movement of the pin into locking engagement within the slot in either direction of rotation of the driving member with respect to the driven member.

4. In a clutch, an actuator mechanism for effecting locking engagement between first locking means carried by a member to be driven and second locking means keyed for rotation on a drive shaft and being axially movable along said shaft into engagement with said first locking means, said actuator mechanism comprising fixed actuating means in outer spaced relation to the drive shaft on one side of said second locking means opposite said first locking means, movable actuating means being connected for rotation with the drive shaft between said second locking means and said fixed actuating means, said fixed and movable actuating means having inter-engaging cam portions being operative to shift said second locking means into locking engagement with said first locking means in response to rotation of said movable actuating means relative to said fixed actuating means, a spring member normally urging said movable actuating means toward said fixed member while permitting relative rotation therebetween, and intermeshing teeth between said movable actuating means and said second locking means drivingly interconnecting said movable actuating means for rotation with said second locking means in order to shift said second locking means into locking engagement with said first locking means.

5. In a clutch according to claim 4, said cam portions for said actuator mechanism being defined by a plurality of spaced convex surfaces arranged in complementary relation whereupon rotation of said movable actuating means the convex surfaces of said movable actuating means are forced outwardly along the convex surfaces of said fixed actuating means to cause outward axial displacement of said second locking means toward said first locking means.

6. In a clutch, an actuator mechanism for effecting automatic engagement between first locking means carried by a member to be driven and second locking means keyed for rotation on a drive shaft and the second locking means being axially movable along said shaft into and out of positive rotatable locking engagement with said first locking means, said actuator mechanism comprising a fixed cylindrical cam mounted in spaced outer concentric relation to the drive shaft on one side of the second locking means opposite the first locking means, a movable cylindrical cam drivingly connected for rotation with the second locking means between the second locking means and said fixed cam, said movable cam and said fixed cam having inter-engageable generally convex cam surfaces, means normally urging said cam surfaces into interengaging relation, and said movable cam surfaces being axially displaced away from the fixed cam surfaces when said movable cam is rotated with respect to said fixed cam thereby to shift the second locking means into position for positive locking engagement with the first locking means, and said movable cam surfaces being further movable away from said second locking means upon shifting said second locking means into position for positive locking engagement with said first locking means.

7. A clutch for effecting positive locking engagement between an inner drive axle and an outer concentric rotating wheel, said clutch comprising a drive clutch member slidably splined adjacent to the end of the drive axle and having radially projecting pins at spaced circumferential intervals thereon, a locking ring intruding from said wheel into normally spaced axial relation to said pins including a series of, axially extending pin-receiving slots, each of said slots having a limited opening in facing relation to a respective pin to provide for axial movement of the pins into the slots, means on said axle biasing said drive clutch member and pins axially away from said locking ring, and shifting means engageable with said drive gear to shift said drive clutch member against the urging of said resilient means toward said locking ring until said pins pass through the limited openings of said slots whereupon rotation of said axle in either direction said pins are held in locked relation within said slots for conjoint rotation of said wheel with said axle.

8. A clutch according to claim 7, said slots having divergent walls extending axially away from the openings to cause continued axial movement of said pins into locking engagement within the slots under either direction of rotation of the drive axle.

9. A clutch for selectively and automatically engaging and disengaging an inner drive axle and an outer concentric rotating wheel, said clutch comprising a drive clutch slidably splined at one end of the drive axle, said drive clutch having radially projecting pins at spaced circumferential intervals, a cover connected to said wheel including a locking ring disposed in spaced outer concentric relation to the drive axle, said locking ring having a series of axially extending pin-receiving slots in facing relation to said pins, each of said slots being formed to converge axially toward said pins, resilient means normally urging said drive gear axially away from said locking ring, and shifting means engageable with said drive gear to shift said drive clutch against the urging of said resilient means toward said locking ring until said pins enter said slots whereupon rotation of said axle in either direction of rotation said pins are held in locked relation within said slots for conjoint rotation of the wheel with the drive axle.

10. A clutch for selectively and automatically engaging and disengaging an inner drive axle and an outer concentric rotating wheel in a four-wheel drive vehicle wherein the inner drive axle is mounted for rotation within a stationary axle housing and the drive axle includes a splined end portion projecting outwardly from one end of the axle housing, said clutch comprising: a drive clutch disposed on the splined end portion of the drive axle and a spring biasing said drive clutch inwardly toward the end of the axle housing, said drive clutch having plurality of radially projecting locking pins at spaced circumferential intervals thereon; a cover assembly connected to said wheel for rotation therewith including a locking ring mounted within said cover assembly in spaced outer concentric relation to the splined end portion, said locking ring having a series of pin-receiving slots of generally oval shape and having limited entrances disposed in facing relation to said pins; and an actuator assembly including a fixed, an inner cam and outer spring retainer ring connected in fixed relation to the end of the axial housing in outer spaced relation to the splined end portion of the drive axle, a movable cam positioned within said spring retainer ring, said fixed and movable cams having inter-engaging cam portions therebetween and a spring member within said spring retainer ring normally biasing said movable cam into interengaging relation with said fixed cam, and intermeshing teeth portions between said drive clutch and the end of said movable cam opposite said inter-engaging cam portions being operative in response to rotation of the drive axle and drive clutch to rotate said movable cam relative to said fixed cam thereby displacing said movable cam and drive clutch outwardly towards said locking ring a sufficient distance to move said locking pins through the slot entrances of the locking ring, and said slots causing continued axial movement of said pins into locking engagement within the slots and away from said movable cam under either direction of rotation of the drive axle whereupon said movable cam is free to return to interengaging relation with said fixed cam under the influence of said spring member.

11. An automatic clutch disposed for selective locking engagement of a rotatable driving member with a member to be rotatably driven automatically when torque is applied to said driving member, said clutch comprising first locking means on said member to be driven, second locking means being disposed for rotation with said driving member and being movable axially into and out of aligned relation with said first locking means, resilient means on said driving member yieldably urging said second locking means away from said first locking means, actuating means between said driving member and said second locking means being operative in response to torque applied to said driving member to axially displace said second locking means into aligned relation with said first locking means, and said first and second locking means cooperating when said second locking means is displaced into aligned relation with said first locking means to retain said driving member and member to be driven in rotatable locking engagement independently of said actuating means under continued application of torque to said driving member, and said resilient means being operative to urge said second locking means away from rotatable locking engagement with said first locking means when torque is removed from said driving member.

12. An automatic clutch according to claim 1, said first and second locking means being further characterized by having cooperating locking members movable into rotatable locking engagement with one another in response to application of torque to said driving member independently of the relative speed of rotation between said driving member and member to be driven.

References Cited by the Examiner

UNITED STATES PATENTS 745,763   12/1903   Barlow _____ 192—100

FOREIGN PATENTS 457,726   10/1949   Italy.

DAVID J. WILLIAMOWSKY, *Primary Examiner.*